July 10, 1962  E. T. STRICKLAND ETAL  3,043,017
ARTICLE CURING MECHANISM
Filed Aug. 22, 1958  2 Sheets-Sheet 2

INVENTORS.
EDWARD T. STRICKLAND
HOMER C. AMOS
BY Schroeder, Hofgren,
Brady & Wegner
ATTORNEYS

United States Patent Office 3,043,017
Patented July 10, 1962

3,043,017
ARTICLE CURING MECHANISM
Edward T. Strickland and Homer C. Amos, Palm Springs, Calif., assignors, by mesne assignments, to Philbrick-Strickland Laminates, Inc., a corporation of Washington
Filed Aug. 22, 1958, Ser. No. 756,646
2 Claims. (Cl. 34—104)

This invention relates to article curing mechanism and more particularly to a hot air curing assembly for a laminate.

An object of this invention is to provide new and improved hot air curing mechanism for an article.

Another object of the invention is to provide hot air curing mechanism for a hollow article in which the article is supported with a hollow member provided with air orifices disposed therein in spaced relation thereto, and means for blowing air under pressure into the hollow member whereby the pressure of the blown air is converted to increased air velocity by passing through the orifices and the air velocity is converted into heat externally of the hollow member and within the article by the turbulence of the air as it returns to normal flow velocity, whereby the interior of the work piece is heated.

Another object of the invention is to provide a laminate curing assembly comprising, a cabinet having a top plate to support a hollow mandrel carrying a work piece, an air chamber in said cabinet, an air outlet from said chamber centrally located in said cabinet top and having a baffle, an air inlet to said chamber surrounding the air outlet and substantially sealed from atmosphere by the surrounding mandrel, a hollow member having a plurality of orifices along the length thereof positionable within the mandrel for substantially the entire length thereof and overlying the air outlet, a centrifugal blower in said chamber for compressing air and directing air from the chamber through the outlet whereby the air travels through the orifices to increase its velocity and the velocity is converted to heat outwardly of said member, and insulating means for surrounding the mandrel to control the temperature of the air between the mandrel and insulating means.

Other features and advantages of the invention will be apparent from the following description taken in connection with the accompanying drawing, wherein.

Figure 1:
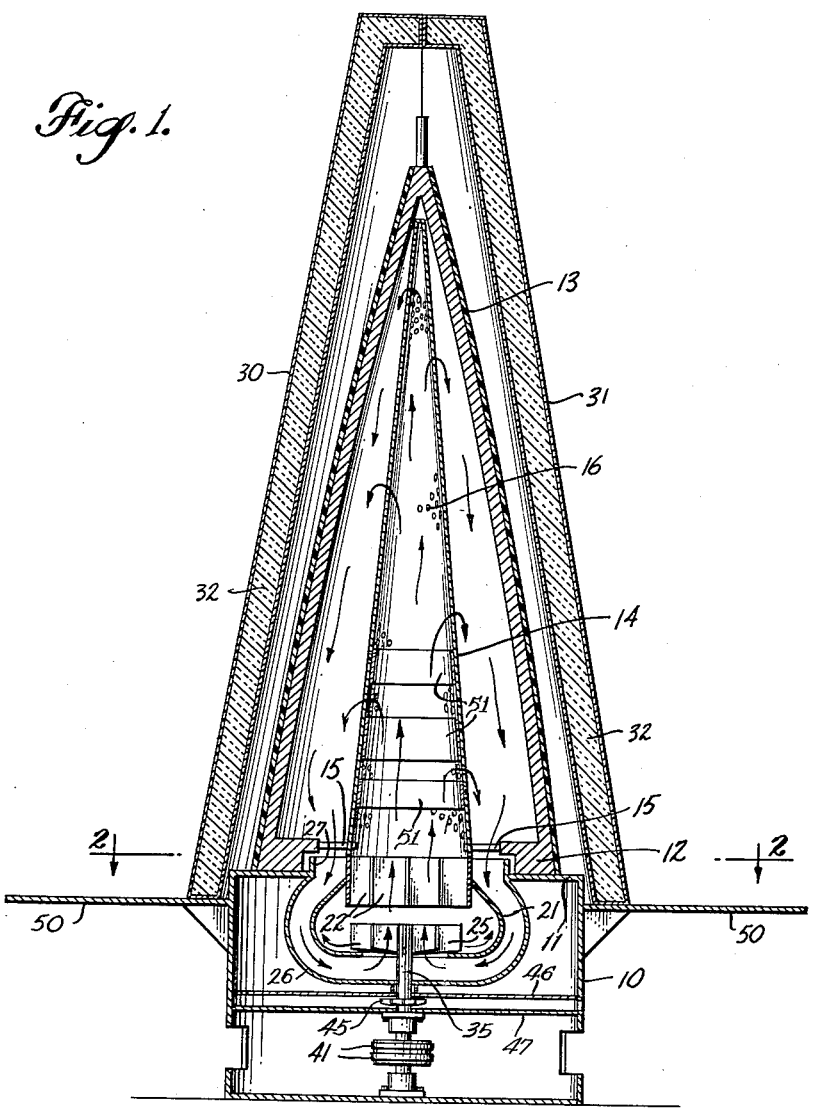
FIG. 1 is a vertical section taken through the center of the curing assembly with details of the parts omitted, and showing the direction of air flow by directional arrows.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, a substantially enclosed cabinet 10 has a top plate 11 adapted to support a hollow mandrel 12 carrying a work piece 13. The mandrel 12 engages the top plate 11 to substantially seal the inside of the mandrel from atmosphere. The work piece, as illustrated, may be a radome which consists of a plurality of glassfiber layers treated with a thermo-setting resin. Upon heat treatment of the article, the resin is cured to form the work piece into a cured laminate structure. The disclosed mechanism enables internal heating which causes expansion of the mandrel formed of metal to tightly confine the inner side of the work piece.

The mandrel 12 has a hollow perforate member 14 disposed therewithin in spaced relation and extending for substantially the entire length of the mandrel as shown in FIG. 1. The hollow perforate member 14 is fastened to the mandrel at its base by connections 15 between the parts. The hollow perforate member 14 has a plurality of air orifices 16 extending along the length thereof for a purpose more fully described hereinafter.

Figure 3:
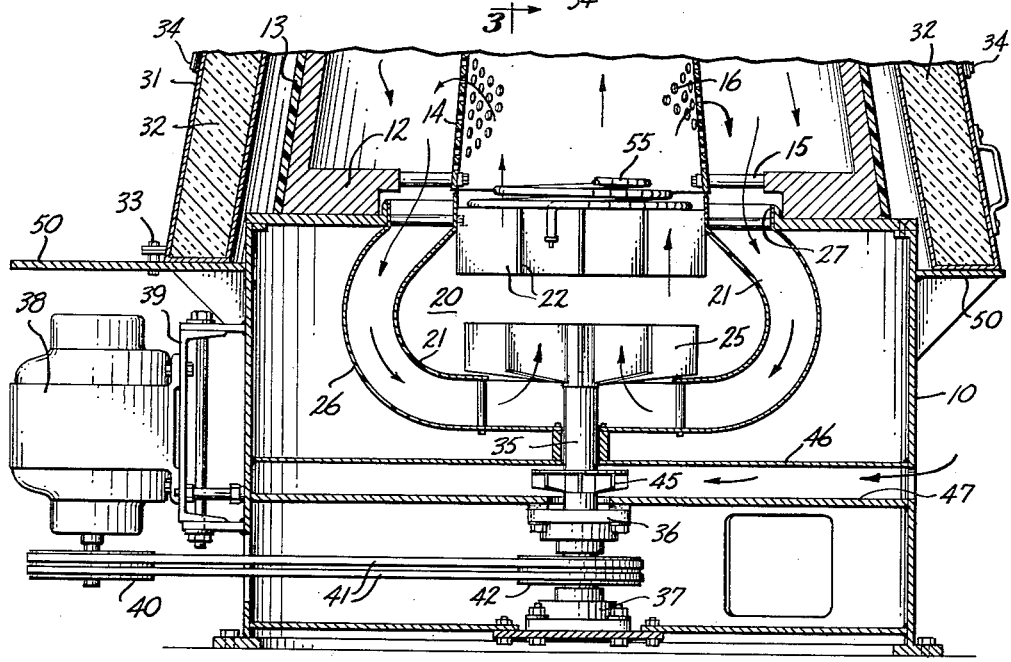
FIG. 3 is a partial vertical section on an enlarged scale taken generally along the line 3—3 in FIG. 2 with the work piece and the perforated member shown in located position.

The cabinet 10 is provided with an air chamber 20 which is formed by walls 21 forming part of an air inlet passage leading to the chamber 20. An air outlet from the air chamber 20 is provided in the cabinet top plate 11 and includes a plurality of baffle plates 22. As shown in FIGS. 1 and 3, the air outlet is associated with the hollow perforate member 14 to have the member 14 overlying the air outlet, whereby air under pressure from the air chamber 20 will pass into the interior of the member 14 and then pass through the orifices 16 in the perforate member 14.

A centrifugal blower 25 has a plurality of blades and is rotatable in the chamber 20 to compress air. Heat energy is generated by turbulent action of the air about the blower blades and the outlet baffle plates 22, and the air then passes to the interior of the hollow perforate member 14. The air pressure is converted to increased air velocity by the air passing through the orifices 16. The air velocity is then converted into heat exteriorly of the perforate member 14 and within the mandrel 12 by the turbulence of the air as it returns to normal flow velocity. The cycle is repeated on a continuous flow basis since the air exteriorly of the perforate member 14 then flows back to the air chamber 20 through an air inlet 27 surrounding the air outlet and formed by openings in the top plate 11 of the cabinet. A passage, including the plates 21, previously referred to, and additional plates 26, connects the air inlet to the chamber 20.

Figure 2:
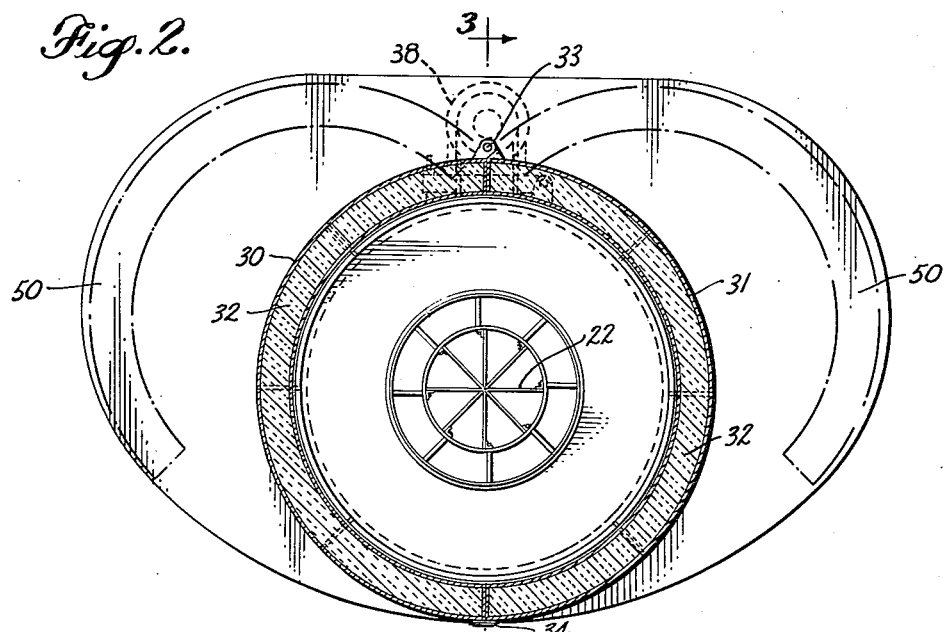
FIG. 2 is a horizontal section taken generally along the line 2—2 in FIG. 1 with a work piece and the internal perforate member removed and with the insulating frame shown in open position in broken line.

The curing assembly further includes an outside insulation frame for the work piece including a pair of pivotally interconnected upstanding frames 30 and 31, each of which are filled with a suitable insulating material 32. Each of the frames 30 and 31 are mounted on the cabinet 10 by a pivot pin 33 for pivotal movement between the full line closed position shown in FIG. 2 and the broken line open position which permits loading and unloading of a mandrel and work piece from the assembly. A latch 34 is provided to hold the frames 30 and 31 in closed position.

Means for rotatably mounting the blower 25 and driving the blower include a mounting shaft 35 rotatably mounted in bearings 36 and 37 supported on the cabinet 10, and a drive motor 38 attached to the cabinet by a mounting bracket 39 and having a drive pulley assembly 40 connected by belts 41 to a pulley assembly 42 on the blower shaft 35.

A bladed member 45 is mounted on the blower shaft 35 beneath an enclosing wall 46 of the cabinet 10 to function as a heat slinger to avoid the transmittal of heat into the shaft bearings 36 and 37. This is accomplished by transferring heat to air which may flow through a channel 47 in which the heat slinger 45 is located.

The cabinet 10 is provided with a pair of outwardly extending support plates 50 attached thereto to form a support for the insulating frame members 30 and 31.

With the foregoing structure, all of the energy required to power the blower is converted into heat and the air velocity and turbulent action thereof accomplishes a good transfer of heat from the air to the interior of the mandrel 12. The desired temperature of the work piece can be obtained by controlling the thickness of the outside insulation layer carried in the frames 30 and 31. Further temperature control can be obtained by the spacing of the orifices 16 in the hollow perforate member 14. As shown in FIG. 1, the temperature control can also be obtained by the use of baffles 51 fitted against the interior of the perforate member 14. The baffles block certain of the orifices 16 to make certain that the air reaches the upper end of the member 14, and also function to control the temperature externally of the member due to the selective blocking of orifices.

Additional heat may be provided by placing a heating element 55 in the air path adjacent the air outlet.

With the construction disclosed herein it is possible to reach a temperature of 300° F. within the mandrel 12, and the heating elements 55 can further increase the temperature of the air.

We claim:

1. A laminate curing assembly comprising, a cabinet having a top, means defining an air chamber in said cabinet, means defining an air outlet from said chamber centrally located in said cabinet top and having a baffle disposed therein, means defining an air inlet to said chamber surrounding the air outlet, a mandrel for supporting a work piece adapted to rest on the cabinet top in surrounding relation with the air inlet, a hollow member of substantially the same length as the mandrel having a plurality of orifices along its length, said hollow member being positioned within the mandrel and overlying the air outlet, a heating coil disposed adjacent the air outlet, a centrifugal blower in said chamber for compressing air and directing air from the chamber through the outlet whereby the air travels through the orifices to increase its velocity and the velocity is converted to heat outwardly of said member by turbulence of the air returning to normal flow velocity and for drawing air back into the chamber through the inlet, and insulating means for surrounding the work piece to control the temperature of the air surrounding the work piece.

2. A curing mechanism comprising, in combination, a hollow mandrel, a cabinet having a top for support of the hollow mandrel carrying a work piece, means defining an air chamber in said cabinet, means defining an air outlet from said chamber centrally located in said cabinet top and having a baffle disposed therein, means defining an air inlet to said chamber surrounding the air outlet, a hollow member having a plurality of orifices, said hollow member being positioned within the mandrel and overlying the air outlet, a centrifugal blower in said chamber for compressing air and directing air from the chamber through the outlet whereby the air travels through the orifices and back through the air inlet, insulating means for surrounding the work piece to control the temperature of the air surrounding the work piece, and baffle means within the hollow member blocking some of said orifices.

References Cited in the file of this patent

UNITED STATES PATENTS

| 374,069 | Hime | Nov. 29, 1887 |
| 2,480,227 | Derr | Aug. 30, 1949 |

FOREIGN PATENTS

| 792,539 | Great Britain | Mar. 26, 1958 |